United States Patent
Sardat et al.

(10) Patent No.: US 8,680,825 B2
(45) Date of Patent: Mar. 25, 2014

(54) METHOD FOR CLOSED-LOOP CONTROL OF A DC-DC VOLTAGE CONVERTER COMPRISING A PLURALITY OF INTERLACED CELLS OPERATING IN ZERO-VOLTAGE SWITCHING MODE

(75) Inventors: Pierre Sardat, Le Raincy (FR); Luis De Sousa, Eragny sur Seine (FR); Stephane Fontaine, Clichy (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 298 days.

(21) Appl. No.: 13/166,334

(22) Filed: Jun. 22, 2011

(65) Prior Publication Data

US 2011/0316497 A1     Dec. 29, 2011

(30) Foreign Application Priority Data

Jun. 25, 2010   (FR) ........................... 1055094

(51) Int. Cl.
  *G05F 1/618* (2006.01)
  *G05F 1/575* (2006.01)
(52) U.S. Cl.
  USPC ........................................... 323/271; 323/284
(58) Field of Classification Search
  USPC .......... 323/225, 268, 271, 272, 282, 284, 285
  See application file for complete search history.

(56) References Cited

U.S. PATENT DOCUMENTS 6,628,106 B1   9/2003  Batarseh et al.
  2011/0018519 A1*  1/2011  Chatroux et al. ............. 323/299

FOREIGN PATENT DOCUMENTS

WO     2005/006526 A1    1/2005

OTHER PUBLICATIONS

French Search Report issued in the corresponding French application No. 1055094, mailing date Feb. 1, 2011 (2 pages).
Abu-Qahouq J et al.: "Multiphase Voltage-Mode Hysteretic Controlled DC-DC Converter With Novel Current Sharing", IEEE Transactions on Power Electronics, IEEE Service Center, Piscataway, NJ, US, vol. 19, No. 6, Nov. 1, 2004 (pp. 1397-1407).
Pengfei Li et al.: "A Delay-Locked Loop Synchronization Scheme for High-Frequency Multiphase Hysteretic DC-DC Converters", IEEE Journal of Solid-State Circuits, IEEE Service Center, Piscataway, NJ, US, vol. 44, No. 11, Nov. 1, 2009 (pp. 3131-3145).

* cited by examiner

*Primary Examiner* — Gary L Laxton
(74) *Attorney, Agent, or Firm* — Osha Liang LLP

(57) ABSTRACT

A DC-DC voltage converter operating in zero-voltage switching mode with a switching threshold includes a plurality of interlaced cells, each cell having at least two controlled switches that are configured to be alternately closed and open, and each cell having an inductor in which an output current from the cell flows. The converter also includes a clock with a given switching period configured for triggering the switching of the switches between upper and lower control thresholds. A method for closed-loop control of the converter includes measuring, for each cell, an overrun period, determining a correction time corresponding to a minimum overrun period measured for the plurality of cells during an interlacing cycle, calculating an optimized switching period for the clock, and applying the optimized switching period to the clock to provide closed-loop control of the interlacing of the output currents from the plurality of cells of the converter.

9 Claims, 4 Drawing Sheets

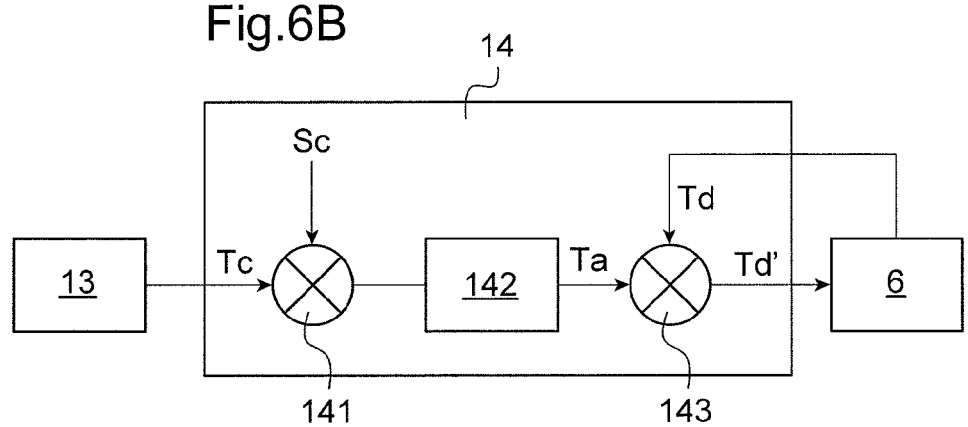
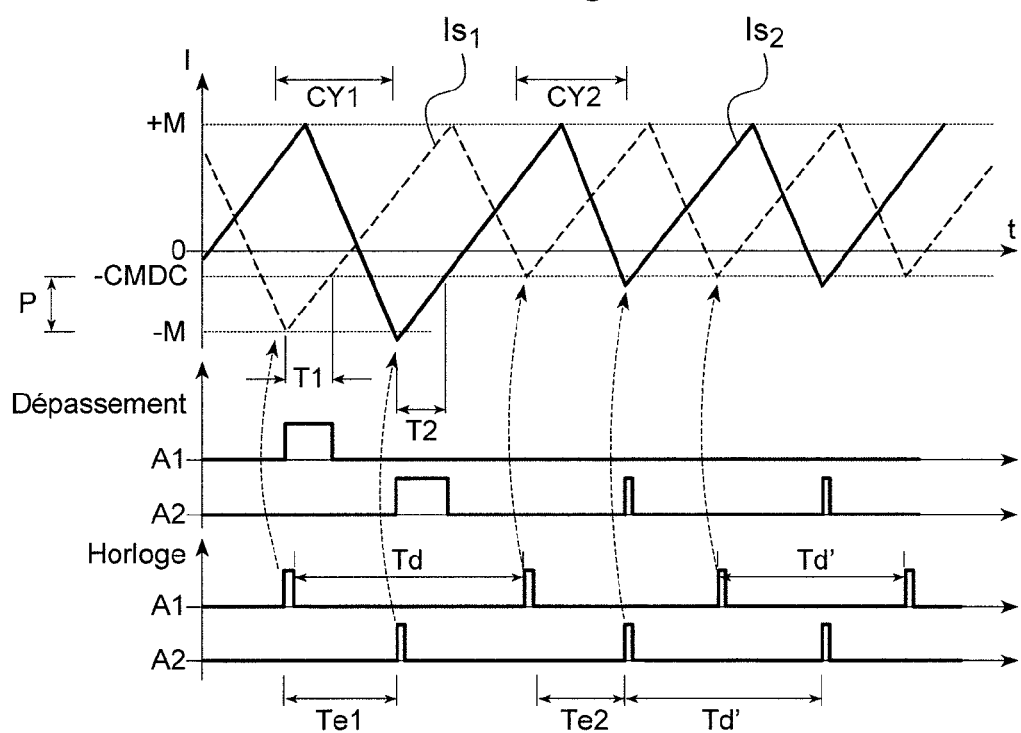

METHOD FOR CLOSED-LOOP CONTROL OF A DC-DC VOLTAGE CONVERTER COMPRISING A PLURALITY OF INTERLACED CELLS OPERATING IN ZERO-VOLTAGE SWITCHING MODE

BACKGROUND OF THE INVENTION (1) Field of the Invention

The invention relates to the field of energy conversion and, more particularly, direct current-direct current voltage converters, well known to those skilled in the art and conventionally referred to just as DC-DC converters. The invention more specifically aims to limit the losses in a DC-DC converter comprising a plurality of interlaced cells, known by the name of interlaced multi-cell converter.

(2) Description of Related Art

A voltage converter conventionally comprises power cells each comprising switches which are controlled in such a manner as to chop an input voltage so as to form an output voltage of desired value.

In order to limit the switching losses, a known solution is to use a converter that comprises power cells comprising switches with controlled turn-off and soft start. With reference to FIG. 1, a power cell A comprises two switches K1, K2, connected in series, which are controlled in an alternating manner by a control device not shown. Each switch K1, K2 has a capacitor C1, C2 connected in parallel so as to delay the rise of the voltage and avoid the switching losses of the switches K1, K2. Each power cell A furthermore comprises an inductor L one end of which is connected between the two switches K1, K2 as shown in FIG. 1. The other end of the inductor, referenced S in FIG. 1, forms the output of the cell A and is connected to a load 1 which is supplied by the current Is output from the power cell A, whose value depends on the switching operation of the switches K1, K2.

In order to limit the switching losses, each cell switches at a voltage zero, known as ZVS for "Zero Voltage Switching", with a Capacitor Minimum Discharge Current threshold, known as CMDC switching threshold, which must be exceeded in order to enable ZVS switching. Such a ZVS-controlled power cell with its CMDC switching threshold is known to those skilled in the art.

In order to obtain an output voltage of desired value for a ZVS voltage-zero switching mode, a known solution is to make the current in the coil L of the power cell A oscillate between an upper threshold M and a lower threshold N, the cell switching when the intensity of the current reaches one of the thresholds N, M at times Tn, Tm as shown in FIGS. 2 to 4.

As shown in FIG. 2, with a high load, the output current Is in the inductor L oscillates with high amplitude. Its average value $Im_h$ of around 40 A-50 A, corresponds to the current which is consumed by the load 1, the slope of the oscillation depending on the value of the inductor L.

The electrical losses in the cell A are a function of the oscillation of the current Is. For high loads, the electrical losses are relatively high but are generally negligible compared to the output power supplied to the said load 1.

For low loads, as shown in FIG. 3, the values of the thresholds are modified in order to obtain a low-load average current $Im_b$ of around 1-10 A. The curve of output current Is in the inductor L is shifted downwards, the average value $Im_b$ corresponding to the current consumed by the load 1. For low loads, the output current consumed is not very high but the electrical losses associated with the oscillations of the output current Is remain constant. The energy efficiency is low.

In order to overcome this drawback, a known solution is to increase the switching frequency of the cell so as to limit the amplitude of the oscillations as shown in FIG. 4. In order to increase the switching frequency, a switching control device is known that is based on the hysteresis principle which allows the difference between the upper threshold M and lower threshold N to be varied as a function of the value of the load 1, in other words of the value of the output current Is consumed by the load 1. In other words, the higher the value of the load, the greater the difference between the upper threshold M and the lower threshold N.

For low loads, with reference to FIG. 4, the lower threshold value N and the upper threshold value M are close in accordance with the hysteresis principle. The output current Is oscillates with a lower amplitude but at a higher frequency, the value of the slope of the oscillation being constant owing to the fact that it depends directly on the value of the inductor L. Since the amplitude of the oscillations is lower, the electrical losses are less. Such an operation is satisfactory for a single-cell voltage converter.

In order to obtain a substantially continuous output current in the load 1, an interlaced multi-cell voltage converter is known that comprises a plurality of power cells each supplying a sinusoidal output current which is phase-shifted with respect to the other currents of the cells. Thus, the sum of the currents of the cells forms a "smoothed", virtually continuous, overall current which improves the lifetime of the load receiving such an output current.

In order to limit the electrical losses with a low load for a multi-cell converter, an immediate solution would be to modify the switching frequency in the same manner as for a single-cell converter according to the hysteresis principle. However, this solution presents drawbacks associated with the dispersion of the values of the inductors L in the cells A. The problem is that, since the slope of the current intensity curve depends on the inductance L, the switching frequencies of the cells are different.

The result of this is that the output currents Is of the cells which are initially out of phase by the same phase difference period so as to form a smooth overall current, are phase-shifted with respect to one another over time. In the most critical case, the output currents of the cells can oscillate in phase. Thus, in contrast to the desired goal, a control device relying on the hysteresis principle results in large oscillations in the overall output current of an interlaced multi-cell converter.

Furthermore, for a low load, the switching frequency of the cells increases owing to the hysteresis, which increases the probability of in-phase oscillations of the output currents of the cells. The overall output current obtained then exhibits oscillations with high amplitudes which lead to significant electrical losses. An increase in frequency according to the hysteresis principle for an interlaced multi-cell converter does not allow the electrical losses to be limited, but quite the contrary.

SUMMARY OF THE INVENTION

In order to overcome at least some of these drawbacks, exemplary embodiments of the invention provide a method for closed-loop control of a DC-DC voltage converter operating in zero-voltage switching mode with a switching threshold, the converter comprising:

a plurality of interlaced cells, each cell comprising at least two controlled switches, configured to be alternately closed and open, and an inductor in which an output current from the cell flows, and the converter furthermore comprising a clock with a given switching period configured for triggering the switching of the switches between upper and lower control thresholds, the control threshold with the value nearest to the switching threshold being denoted associated control threshold, in which method:

for each cell, an overrun period is measured, this being the time between the moment when the output current intensity from the cell is equal to the associated control threshold and the moment when the output current intensity from the cell is equal to the switching threshold;

a correction time is determined corresponding to the minimum overrun period measured for the plurality of cells during an interlacing cycle, an interlacing cycle corresponding to the time during which an overrun period is measured for the plurality of cells;

an optimized switching period for the clock is calculated by subtracting from the determined switching period an anticipation time which is a function of the correction time; and the optimized switching period is applied to the clock in such a manner as to provide closed-loop control of the interlacing of the output currents from the cells of the converter.

The above-mentioned exemplary embodiments of the invention are conceived from a desire to limit the electrical losses for an interlaced multi-cell converter with low load. Nevertheless, the method according to these exemplary embodiments of the invention allows the phase-shifting of the interlacing of the cells in a converter to be limited, both under low-load and under high-load conditions.

Thanks to the method according to these exemplary embodiments of the invention, the switching frequency of the clock is closed-loop controlled as a function of the measured overrun periods. Thus, the phase difference between the cells of the converter remains constant over time. The closed-loop control of the output currents enables a smooth current at the output of the interlaced multi-cell converter to be guaranteed, both under low-load and under high-load conditions. Furthermore, the switching of the cells of the converter always occurs within the switching range which guarantees low switching losses.

According to a first aspect, the anticipation time is equal to the correction time. The modification of the switching period of the clock allows the overrun time for a cell to be cancelled and the difference in phase-shift of the other cells to be reduced in order to obtain closed-loop controlled output currents.

According to another aspect, a correction threshold is predetermined, and the anticipation time is equal to the correction time if the correction time is lower than the correction threshold. Preferably, the anticipation time is equal to the correction threshold if the correction time is greater than the correction threshold. By limiting the value of the anticipation time, the output currents are closed-loop controlled in a stepwise manner, the modification of the switching frequency of the cells being carried out in a progressive manner.

Preferably, an optimized switching period is applied to the clock after a predetermined number of interlacing cycles. The closed-loop control is thus applied periodically in order to correct any interlacing errors of the output currents over time.

Preferably again, an optimized switching period is applied to the clock at each cycle. Thus, the output currents are in continuous closed-loop control which guarantees a virtually continuous output current at the output of the converter.

Other exemplary embodiments of the invention provide a closed-loop control device, implementing the method presented hereinabove, for a DC-DC voltage converter comprising a plurality of interlaced cells, each cell comprising at least two controlled switches, configured to be alternately closed and open, and an inductor in which an output current from the cell flows, the converter furthermore comprising a clock with a given switching period configured for triggering the switching of the switches between upper and lower control thresholds, the control threshold with the value nearest to the switching threshold being denoted associated control threshold, the device comprising:

at least one overrun block configured to measure, for each cell, an overrun period, this being the time between the moment when the output current intensity from the cell is equal to the associated threshold and the moment when the output current intensity from the cell is equal to the switching threshold;

a storage memory for recording the overrun periods measured by the overrun block;

a correction block configured to determine in the storage memory a correction time corresponding to the minimum overrun period measured for the plurality of cells during an interlacing cycle, an interlacing cycle corresponding to the time during which an overrun period is measured for the plurality of cells; and an optimization block configured to calculate an optimized switching period for the clock by subtracting from the determined switching period an anticipation time which is a function of the correction time and to apply the optimized switching period to the clock in such a manner as to provide closed-loop control of the interlacing of the output currents from the cells of the converter.

Preferably, the optimization block comprises a regulation module configured for regulating the value of the anticipation time.

Preferably, the optimization block comprises a limitation module configured for bounding the value of the correction time.

Preferably, the device comprises a first comparator configured for comparing the output current intensity from a cell at a predetermined control threshold in such a manner as to control the switching of the switches for the said predetermined control threshold, the clock controlling the switching of the switches for the said other control threshold.

Preferably, the device comprising a second comparator configured for comparing the output current intensity from a cell at the said switching threshold, the overrun block is connected to the said second comparator for measuring the overrun period of the said cell.

Preferably, the device furthermore comprises a control module configured for controlling the switching threshold of the second comparator.

Preferably, the device furthermore comprises a control module configured for controlling the said predetermined control threshold of the first comparator.

Other exemplary embodiments of the invention provide a DC-DC voltage converter comprising a closed-loop control device as presented hereinabove, a computer programme for the execution of the method such as previously presented and a recording medium in which the said programme is stored.

BRIEF DESCRIPTION OF DRAWINGS

The invention will be better understood with the aid of the appended drawings, in which:

FIG. 6B shows a preferred embodiment of the optimization block of the device in FIG. 6A;

FIG. 7 is a representation of the output currents of two interlaced cells during the implementation of the closed-loop control method of the invention over two interlacing cycles with a histogram of the overrun periods of the cells and a histogram of the times at which the lower switching operations of the cells occur;

DETAILED DESCRIPTION OF THE INVENTION

Exemplary embodiments of the invention provide an interlaced multi-cell DC-DC voltage converter comprising a plurality of power cells which are interlaced with one another.

Figure 5:
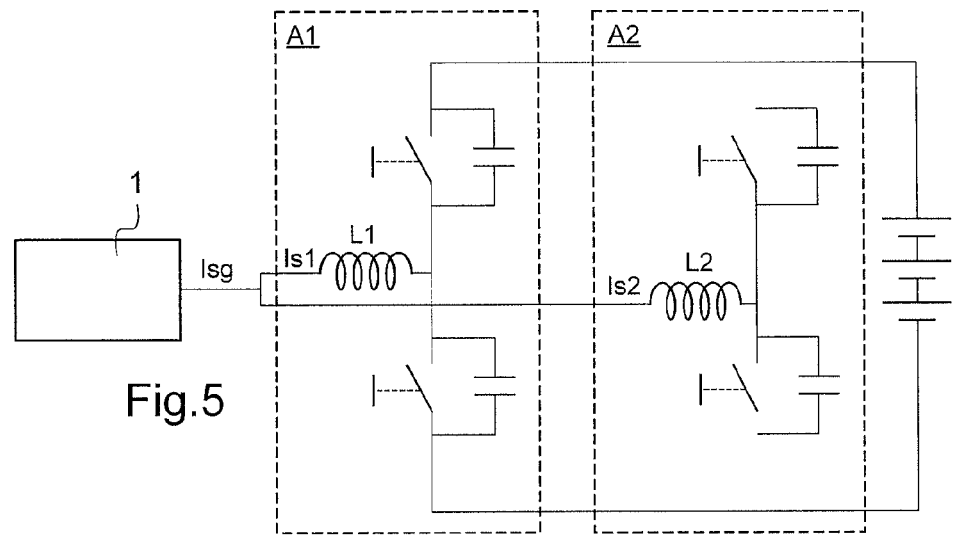
FIG. 5 shows a multi-cell converter with two interlaced cells.

By way of example and with reference to FIG. 5, a multi-cell converter according to the invention comprises two cells A1, A2 and supplies a load 1.

Figure 1:
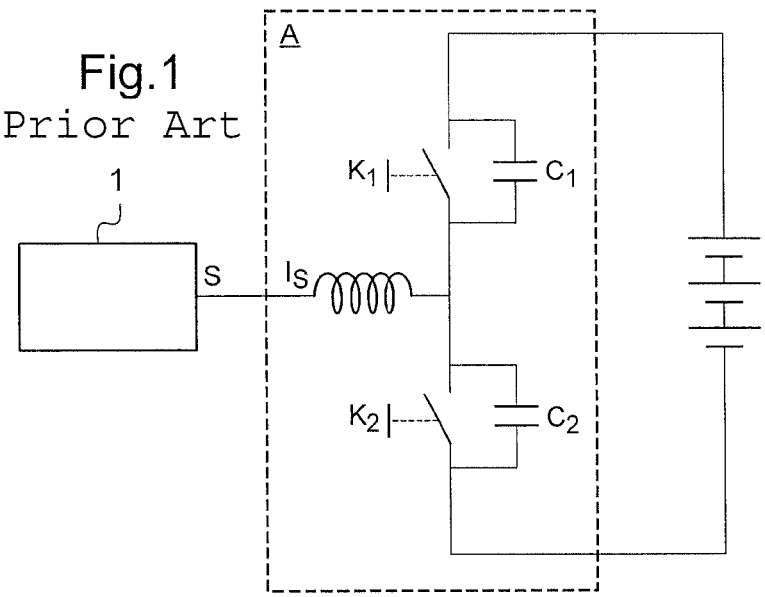
FIG. 1 is a schematic representation of the components of a cell of a DC-DC converter (already discussed)
Figure 2:
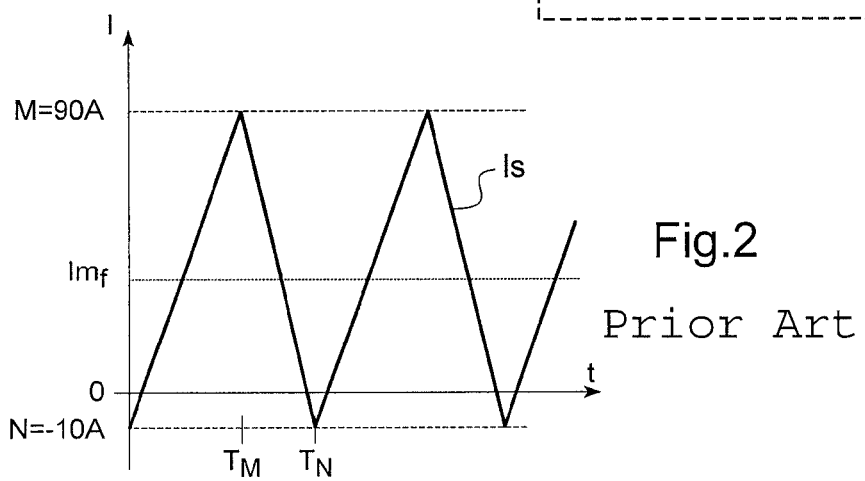
FIG. 2 is a representation of the output current of a cell for supplying equipment with a high load (already discussed)
Figure 3:
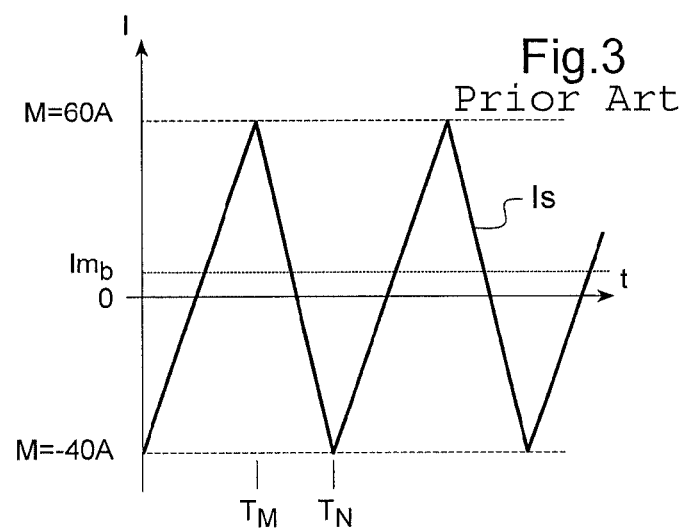
FIG. 3 is a representation of the output current of a cell for supplying equipment with a low load (already discussed)
Figure 4:
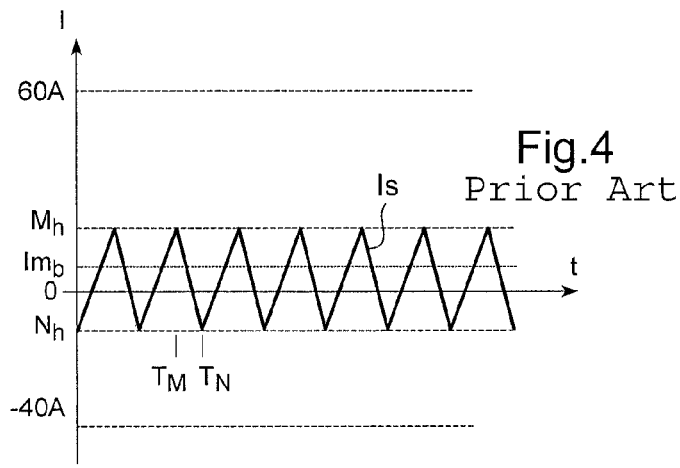
FIG. 4 is a representation of the hysteresis principle for a cell supplying equipment with a low load (already discussed)

With reference to FIG. 1, each power cell comprises two switches K1, K2, connected in series with one another, which are activated alternately by a closed-loop control device 5 shown in FIG. 6. Each switch K1, K2 has a capacitor C1, C2 connected in parallel in such a manner as to delay the rise of the voltage and avoid the switching losses for the switches K1, K2. Each cell furthermore comprises an inductor L1, L2 one end of which is connected between the two switches as shown in FIG. 1. The other end of the inductor, referenced S in FIG. 1, forms the output of the cell and allows the output current intensity Is of the cell resulting from the switching of the switches K1, K2 to be measured.

In order to control the oscillations of the current output from the cells, the voltage converter comprises a closed-loop control device 5 configured for controlling the switches K1, K2 in such a manner that the output current intensity Is of each of the cells oscillates between an upper control threshold and a lower control threshold.

Figure 6A:
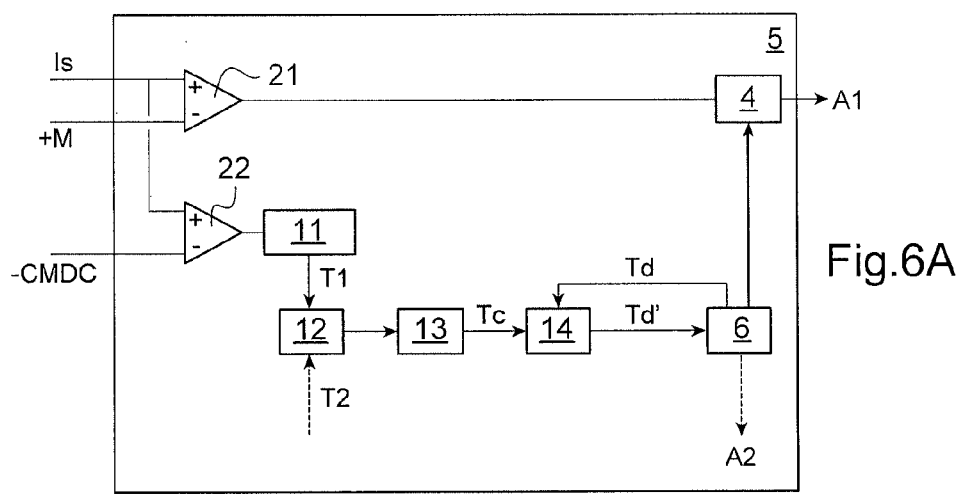
FIG. 6A shows a first embodiment of a closed-loop control device for a voltage converter according to the invention, the closed-loop control device comprising an optimization block.

By way of example, with reference to FIGS. 6A and 7, the closed-loop control device 5 triggers the switching between an upper control threshold, of positive value +M, and a lower control threshold, of negative value −M. +M and −M may, as in the present example, be different in absolute value. For this purpose, the closed-loop control device 5 comprises a first comparator 21, henceforth denoted upper comparator 21, configured for comparing the value of the output current intensity Is of a cell with the value of the upper control threshold +M and configured to make the switches K1, K2 switch in the case where the said upper control threshold +M is exceeded. The switching step at the upper control threshold of a cell is denoted "upper switching" of the cell. In a similar manner, the switching step at the lower control threshold is denoted "lower switching".

The closed-loop control device 5 comprises a control clock 6 configured to make the switches K1, K2 of the cell switch with a given switching period Td. In other words, after a given interval of time Td following the upper switching of the cell, the clock 6 triggers the lower switching of the cell.

With reference to FIG. 6A, the closed-loop control device 5 furthermore comprises a controlled switch 4 configured for triggering an upper switching operation upon the command of the upper comparator 21 and a lower switching operation upon the command of the clock 6.

The switching of the switches K1, K2 is determined, on the one hand, by the upper control threshold +M, and on the other hand, by the switching period Td of the clock 6 in such a manner that the switching is effected when the output current Is of the cell is substantially equal to the lower control threshold −M. As previously indicated, owing to the dispersion in the values of the inductors L1, L2 within the cells, the lower switching of the switches K1, K2 is approximate. This approximation is corrected by the method according to the invention as described in the following.

According to the invention, each cell A1, A2 operates according to a ZVS mode and switches at the voltage zero so as to limit the switching losses. A switching threshold Z is defined which must be exceeded in order to allow switching in ZVS mode. In this example, the switching threshold Z is a Capacitor Minimum Discharge Current threshold, known as CMDC switching threshold.

The upper control threshold +M and lower control threshold −M are adjusted in such a manner that the CMDC switching threshold is included between the two control thresholds −M, +M in order to allow operation in ZVS mode. Such a power cell controlled in ZVS mode is known to those skilled in the art.

The switching threshold Z is denoted as lower switching threshold when it commands the switches to switch in order to cause the current in the cell to rise and as upper switching threshold when it commands the switches to switch in order to cause the current in the cell to fall. Conventionally, for a DC-DC step-down voltage converter, a lower switching threshold of negative value, equal to −CMDC, is defined. On the other hand, for a DC-DC step-up voltage converter, an upper switching threshold of positive value, equal to +CMDC, is defined.

A control threshold is associated with each type of switching threshold Z so as to form a switching range P defined between the switching threshold Z and its associated control threshold. The control threshold with the value nearest to the switching threshold Z is denoted associated switching threshold.

By way of example, for a DC-DC step-down voltage converter, the switching threshold Z is a lower switching threshold with a value of −CMDC and is associated with the lower control threshold −M. The switching range P is defined between the lower switching threshold −CMDC and its lower control threshold −M as shown in FIG. 7. When the switching occurs within the switching range P, the switching operation results in low electrical losses in accordance with the ZVS mode of operation.

With reference to FIG. 5, the multi-cell converter comprises two cells A1, A2 whose outputs are connected to a common output supplying an overall output current intensity $Is_g$ to the load 1. The intensity of the overall output current $Is_g$ of the converter corresponds to the sum of the output currents $Is_1$, $Is_2$ of the cells A1, A2.

In a known manner, in order to obtain a substantially constant output current intensity at the output of the converter, the output currents of the cells are phase-shifted; they are then referred to as interlaced cells. In other words, for a converter comprising n cells, the cells are phase-shifted by one period of interlacing corresponding, theoretically, to the predetermined switching period Td of the clock 6, in such a manner as to obtain an overall output current $Is_g$ with low ripple also denoted "smooth current". Such a current is advantageous owing to the fact that it allows a load, such as an electrical battery, to be recharged simply and quickly without reducing its lifetime.

The closed-loop control device 5 according to the invention is designed to maintain a fixed phase difference between the output currents $Is_1$, $Is_2$ of each of the outputs of the cells A1, A2. In other words, the interlacing of the cells A1, A2 is closed-loop controlled. This is also referred to as closed-loop control of the output currents $Is_1$, $Is_2$ of the cells A1, A2.

The closed-loop control device 5 according to the invention comprises a second comparator 22, known as lower comparator 22, configured for comparing the value of the output current Is of each cell with the lower switching threshold −CMDC.

Figure 8:
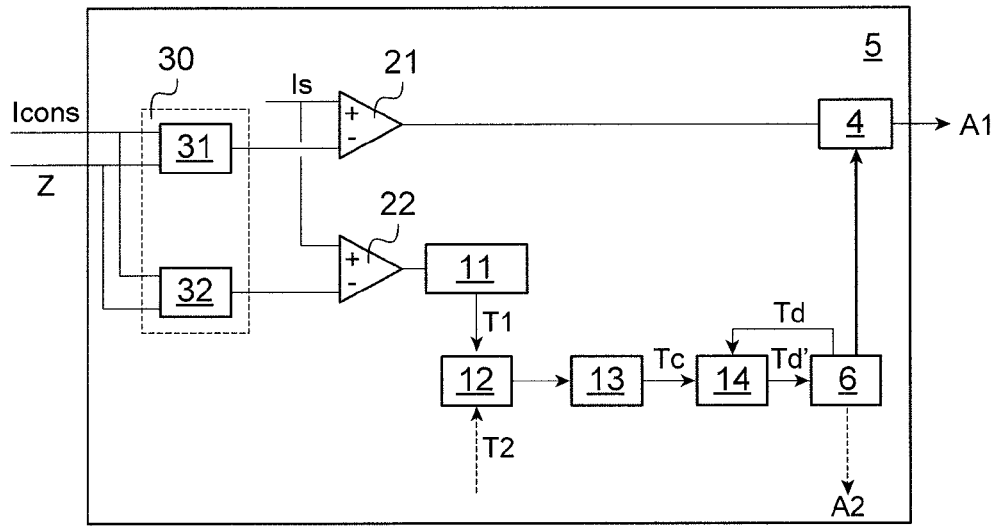
FIG. 8 shows a second embodiment of a closed-loop control device for a voltage converter according to the invention with a control module.

With reference to FIG. 6A, the closed-loop control device 5 comprises at least one overrun block 11, connected to the lower comparator 22, configured to measure, for a power cell A1, A2, an overrun period T1, T2 between the moment when the output current intensity $Is_1$, $Is_2$ of the cell is equal to the associated control threshold −M of the switching range P and the moment when the output current intensity $Is_1$, $Is_2$ of the cell is equal to the switching threshold −CMDC. In this example, since the voltage converter comprises two interlaced cells A1, A2, the closed-loop control device 5 comprises two overrun blocks 11. For reasons of clarity, only one overrun block 11 is shown in FIGS. 6A and 8.

The closed-loop control device 5 furthermore comprises a storage memory 12 in which the overrun periods T1, T2 of each power cell A1, A2, measured by the overrun blocks 11, are stored.

In the following, an interlacing cycle is defined as the time during which an overrun period T1, T2 is measured for all of the power cells A1, A2. In this example, for a converter comprising two interlaced cells, the storage memory 12 comprises two overrun periods T1, T2 for one interlacing cycle. Two interlacing cycles CY1, CY2 are shown in FIG. 7 by way of illustration.

The closed-loop control device 5 also comprises a correction block 13 configured for determining a correction time Tc corresponding to the minimum overrun period measured during an interlacing cycle CY1, CY2. The correction block 13 is connected to the storage memory 12 in order to consult it and hence deduce, from amongst the overrun periods T1, T2 in the memory 12, the minimum overrun period measured during an interlacing cycle CY1, CY2.

The closed-loop control device 5 also comprises an optimization block 14 configured for calculating an anticipation time Ta as a function of the value of the correction time Tc supplied by the correction block 13. The optimization block 14 is also configured for calculating an optimized switching period Td' by subtracting the anticipation time Ta from the determined switching period Td, the optimized switching period Td' then being applied to the clock 6 so as to modify the lower switching times.

In other words, the optimization block 14 is connected to the clock 6 in order to modify the switching period Td of the clock 6 in such a manner as to anticipate a switching operation of the switches of the cells by the anticipation time Ta. The clock 6 then has an optimized switching period Td' defined by the formula hereinbelow:

$$Td' = Td - Ta \quad (1)$$

By virtue of this modification of the switching period Td of the clock 6, the lower switching of the cells A1, A2 is modified while at the same time conserving the ZVS mode of operation. The interlacing of the cells A1, A2 can thus be closed-loop controlled in an efficient and reactive manner.

One embodiment of the closed-loop control device 5 according to the invention will now be presented with reference to FIGS. 6A and 7.

With reference to FIG. 7 showing the intensities of the currents $Is_1$, $Is_2$ output from the DC-DC step-down voltage converter in FIG. 6A, the switching range P is included between a lower switching threshold −CMDC and a lower control threshold −M.

With reference to FIG. 7, for the power cells A1, A2, the overrun block 11 respectively measures a first overrun period T1 and a second overrun period T2 during a first interlacing cycle CY1, the overrun periods T1, T2 being stored in the memory 12 of the closed-loop control device 5.

With reference to FIG. 7, since the overrun period T2 of the second cell A2 is greater than the overrun period T1 of the first cell A1, from this the correction block 13 deduces a correction time Tc that is equal to the overrun period T1 of the first cell A1, corresponding to the minimum overrun period measured during the interlacing cycle CY1.

According to a first embodiment of the invention, the optimization block calculates an anticipation time Ta equal to the correction time Tc. An optimized switching period Td' is calculated for the clock 6 using the formula (I) previously presented. The clock 6, with optimized switching period Td', triggers the switching of each power cell A1, A2 in anticipation with respect to the preceding interlacing cycle.

For the converter, an interlacing duration Te is defined which corresponds to the time between the lower switching of the first cell A1 and that of the second cell A2. In order to maintain interlacing of the cells, the interlacing period Te must be substantially equal to Td/n with Td corresponding to the switching period of the clock 6 and n corresponding to the number of cells in the converter.

With reference to the histogram of the overrun periods of the cells and to the histogram of the lower switching times of the cells in FIG. 7, for the first closed-loop control cycle CY1, the interlacing period Te1 is small with respect to Td/2. The cells are not interlaced. After one closed-loop control cycle, the switching period is modified, as previously indicated, to be equal to Td'. With reference to FIG. 7, for the second closed-loop control cycle CY2, the interlacing period Te2 is equal to the ratio Td'/2. The cells are interlaced and the overall output current $Is_g$ of the converter is substantially continuous.

Thanks to this new switching period Td', the interlacing of the output currents $Is_1$, $Is_2$ of the cells A1, A2 is closed-loop controlled. Since the correction time Tc corresponds to the minimum overrun period in the switching range P, the switching always takes place within the switching range P which guarantees low switching losses in ZVS operation.

With reference to FIG. 7 showing closed-loop control of the switching over two interlacing cycles CY1, CY2, the anticipation time Ta is equal to the correction time Tc calculated in the preceding cycle. Thus, for the first cell A1 whose overrun time T1 is a minimum in the first cycle CY1, it will switch at the switching threshold −CMDC in the second cycle CY2. The second cell A2, on the other hand, will switch under the switching threshold −CMDC within the switching range P, its overrun period having been decreased by the anticipation time Ta.

As previously explained, by reason of the difference in the values of the inductors L1, L2 in the cells A1, A2, the slopes of the output currents $Is_1$, $Is_2$ of the cells A1, A2 can differ from one cell to another. Thus, over time, the overrun periods T1, T2 for each of the cells vary again. The method of closed-loop control of the interlacing of the cells according to the invention allows synchronization of the cells to be guaranteed in a cyclic manner while still remaining in ZVS operation, thus limiting the losses. The switching period Td of the cells is thus dynamically adapted from cycle to cycle.

Preferably, the closed-loop control is carried out in a periodic manner, one period corresponding to a predetermined number of cycles. Preferably, the closed-loop control is continuously implemented, in other words, at each cycle.

According to a preferred embodiment of the optimization block 14, with reference to FIG. 6B, the optimization block 14 comprises a limitation module 141 configured for comparing the correction time Tc calculated in the preceding cycle with a correction threshold Sc of predetermined value. The correction threshold Sc allows closed-loop control of the interlacing of the cells A1, A2 to be implemented in a stepwise manner by limiting the value of the correction time Tc and, as a consequence, limiting the anticipation time Ta which is a function of the correction time Tc.

Thus, if the correction time Tc is greater than the correction threshold Sc, the limitation module 141 applies an anticipation time Ta equal to the value of the correction threshold Sc. Otherwise, the limitation module 141 applies an anticipation time Ta equal to the value of the correction time Tc. In other words, the correction threshold Sc allows the value of the anticipation time Ta to be bounded in order to enable a closed-loop control that is progressively applied during the interlacing cycles CY1, CY2.

The optimization block 14 furthermore comprises a regulation module 142 configured for regulating the value of the anticipation time Ta. By way of example, the regulation module 142 implements a method of the integral-proportional control type. In addition, the optimization module comprises a calculation module 143 configured to subtract the anticipation time Ta from the switching period Td so as to obtain the optimized switching period Td' which is subsequently applied to the clock 6.

An optimization block 14 with several modules that are independent from one another has been described. Thus, the optimization block 14 may comprise a limitation module 141 with no regulation module 142, since the optimization block 14 can comprise any combination of modules.

A second embodiment of the device of the invention is described with reference to FIG. 8. In order to simplify the description, the references used to describe the elements with identical, equivalent or similar structures or functions to those of the elements in FIG. 6A are the same. Furthermore, the whole of the description of the embodiment in FIG. 6A is not restated, since this description is applicable to the elements in FIG. 8 when there are no incompatibilities. Only the notable, structural and functional differences are described.

With reference to FIG. 8, the closed-loop control device 5 furthermore comprises a control module 30 configured to control the setpoints of the comparators 21, 22 in such a manner as to control the converter as a voltage step-up or voltage step-down converter. For this purpose, again with reference to FIG. 8, the control module 30 comprises a first current setpoint input $I_{cons}$ and a second switching input corresponding to the switching threshold Z which are both connected to an upper control block 31 and to a lower control block 32.

With reference to FIG. 8, the upper control block 31 is configured for comparing the two inputs of the control module 30 and for outputting, into the upper comparator 21, the input with the higher value.

The lower control block 32 is configured for comparing the two inputs of the control module 30 and for outputting, into the lower comparator 22, the lower value between the current setpoint input $I_{cons}$ and the inverse of the switching input Z.

The second embodiment of the invention will now be described with reference to FIG. 9. In this example, the current setpoint input $I_{cons}$ decreases in a regular manner from the value M to the value −M, the switching input Z remaining constant and equal to +CMDC, in other words equal to the value of the upper switching threshold.

Figure 9:
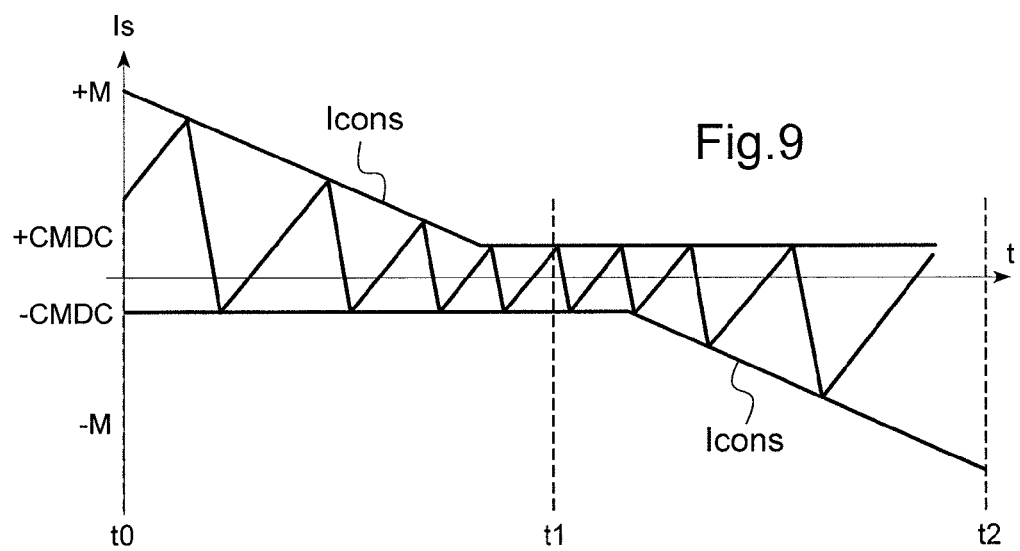
FIG. 9 is a representation of the current output from a cell as a function of the variations of the input parameters of the control module of the closed-loop control device in FIG. 8.

With reference to FIG. 9, at time t0, the upper control block 31 compares the current setpoint input $I_{cons}$, equal to +M, with the switching input +CMDC. As the current setpoint $I_{cons}$ is higher than the switching threshold +CMDC, the upper comparator 21 receives the current setpoint +M at its input, which corresponds to the upper control threshold +M such as previously presented. Similarly, the lower control block 32 compares the current setpoint $I_{cons}$, equal to +M, with the inverse of the switching input, equal to −CMDC. As the current setpoint $I_{cons}$ is higher, the lower comparator 22 receives the value −CMDC at its input, which corresponds to the lower switching threshold, such as previously presented.

Thus, at time t0, the closed-loop control device 5 respectively receives, at the input of its comparators 21, 22, the upper control threshold +M and the lower switching threshold −CMDC. In other words, the first embodiment of the device previously presented corresponds to the second embodiment, at time t0, in which the current setpoint is equal to the upper control threshold +M.

As the current setpoint $I_{cons}$ decreases between t0 and t1, the closed-loop control device 5 adjusts the switching period Td of the clock 6 in such a manner as to maintain closed-loop control of the cells A1, A2 in ZVS switching mode.

At time t1, the upper control block 31 compares the current setpoint $I_{cons}$, equal to 0, with the switching input Z, equal to +CMDC. Since the current setpoint $I_{cons}$ is lower than the switching input Z, the upper comparator 21 receives the upper switching threshold +CMDC at its input.

Similarly, the lower control block 32 compares the current setpoint, equal to 0, with the inverse of the switching input Z, equal to −CMDC. Since the current setpoint $I_{cons}$ is higher, the lower comparator 32 receives the lower switching threshold −CMDC at its input.

Thus, at time t1, the device respectively receives, at the input of its comparators 21, 22, the upper switching threshold +CMDC and the lower switching threshold −CMDC. All the switching operations of the converter are effected in ZVS operating mode which guarantees that its switching losses are limited.

At time t2, the upper control block 31 compares the current setpoint $I_{cons}$, equal to −M, with the switching input Z, equal to +CMDC. As the current setpoint $I_{cons}$ is lower than the switching input Z, the upper comparator 21 receives the upper switching threshold +CMDC at its input.

Similarly, the lower control block 32 compares the current setpoint $I_{cons}$, equal to −M, with the inverse of the switching input Z, equal to −CMDC. As the current setpoint $I_{cons}$ is lower, the lower comparator 22 receives the current setpoint −M at its input.

Thus, at time t2, the device respectively receives, at the input of its comparators 21, 22, the upper switching threshold +CMDC and the current setpoint −M.

As the current setpoint $I_{cons}$ decreases between t1 and t2, the closed-loop control device 5 adjusts the switching period Td of the clock 6 in such a manner as to maintain closed-loop control of the cells while still keeping ZVS switching mode.

The closed-loop control device 5 allows the switching period Td to be adapted according to the current setpoint $I_{cons}$. The converter can thus advantageously operate as a step-up or step-down voltage converter.

Here, the invention has been described for a multi-cell converter with two cells, but it goes without saying that it is equally applicable to a converter comprising more than two cells for supplying a virtually constant overall output current. One particularly advantageous application of the invention is in the area of vehicle battery recharging, in particular for a vehicle referred to as an electric vehicle.

The invention claimed is:

1. A method for closed-loop control of a DC-DC voltage converter operating in zero-voltage switching mode with a switching threshold, the converter comprising:
 a plurality of interlaced cells, each cell comprising at least two controlled switches, configured to be alternately closed and open, and each cell further comprising an inductor in which an output current from each corresponding cell flows, and a clock with a given switching period configured for triggering the switching of the switches between upper and lower control thresholds, a control threshold with a value nearest to the switching threshold being denoted as an associated control threshold,
 the method comprising:
 measuring, for each cell, an overrun period, wherein the overrun period is a time between a first moment when an intensity of the output current from each corresponding cell is equal to the associated control threshold and a second moment when the intensity of the output current from each corresponding cell is equal to the switching threshold;
 determining a correction time corresponding to a minimum overrun period measured for the plurality of cells during an interlacing cycle, the interlacing cycle corresponding to the time during which the overrun period is measured for the plurality of cells;
 calculating an optimized switching period for the clock by subtracting from the given switching period an anticipation time which is a function of the correction time; and
 applying the optimized switching period to the clock to provide closed-loop control of the interlacing of the output currents from the plurality of cells of the converter.

2. The method according to claim 1, in which the anticipation time is equal to the correction time.

3. The method according to claim 1, in which a correction threshold is predetermined, and the anticipation time is equal to the correction time if the correction time is less than the correction threshold.

4. The method according to claim 3, in which the anticipation time is equal to the correction threshold if the correction time is greater than the correction threshold.

5. The method according to claim 1, in which the optimized switching period is applied to the clock, after a predetermined number of interlacing cycles.

6. The method according to claim 1, in which the optimized switching period is applied to the clock at each interlacing cycle.

7. A device for closed-loop control of a DC-DC voltage converter, the converter comprising:
 a plurality of interlaced cells, each cell comprising at least two controlled switches, configured to be alternately closed and open, and each cell further comprising an inductor in which an output current from each corresponding cell flows,
 a clock with a given switching period configured for triggering the switches to switch between upper and lower control thresholds, a control threshold with a value nearest to a switching threshold being denoted as an associated control threshold,
 the device comprising:
 at least one overrun block configured to measure, for each cell, an overrun period, wherein the overrun period is a time between a first moment when an intensity of the output current from each corresponding cell is equal to the associated threshold and a second moment when the intensity of the output current from each corresponding cell is equal to the switching threshold;
 a storage memory for recording the overrun periods measured by the overrun block;
 a correction block configured to determine in the storage memory a correction time corresponding to a minimum overrun period measured for the plurality of cells during an interlacing cycle, the interlacing cycle corresponding to the time during which an overrun period is measured for the plurality of cells; and
 an optimization block configured to:
 calculate an optimized switching period for the clock by subtracting from the given switching period an anticipation time which is a function of the correction time; and
 apply the optimized switching period to the clock to provide closed-loop control of the interlacing of the output currents from the plurality of cells of the converter.

8. A DC-DC voltage converter comprising:
 a plurality of interlaced cells, each cell comprising at least two controlled switches, configured to be alternately closed and open, and each cell further comprising an inductor in which an output current from each corresponding cell flows,
 a clock with a given switching period configured for triggering the switches to switch between upper and lower control thresholds, a control threshold with a value nearest to a switching threshold being denoted as an associated control threshold,
 the device comprising:
 at least one overrun block configured to measure, for each cell, an overrun period, wherein the overrun period is a time between a first moment when an intensity of the output current from each corresponding cell is equal to the associated threshold and a second moment when the intensity of the output current from each corresponding cell is equal to the switching threshold;
 a storage memory for recording the overrun periods measured by the overrun block;
 a correction block configured to determine in the storage memory a correction time corresponding to a minimum overrun period measured for the plurality of cells during an interlacing cycle, the interlacing cycle corresponding to the time during which an overrun period is measured for the plurality of cells; and
 an optimization block configured to:
 calculate an optimized switching period for the clock by subtracting from the given switching period an anticipation time which is a function of the correction time; and apply the optimized switching period to the clock to provide closed-loop control of the interlacing of the output currents from the plurality of cells of the converter.

9. A non-transitory computer readable recording medium having a computer programme stored thereon for executing the method according to claim 1.

* * * * *